US010857779B2

(12) United States Patent
Kwon et al.

(10) Patent No.: US 10,857,779 B2
(45) Date of Patent: Dec. 8, 2020

(54) THREE DIMENSIONAL PATTERN PRINTING DEVICE AND METHOD FOR MANUFACTURING MICRO-OPTICAL FILM STRUCTURE BY USING SAME

(71) Applicant: KOREA INSTITUTE OF MACHINERY & MATERIALS, Daejeon (KR)

(72) Inventors: Sin Kwon, Sejong (KR); Dong-ha Song, Pohang-si (KR); Kye-hee Woo, Goyang-si (KR); Yun-seok Jang, Daejeon (KR); Seung-hyun Lee, Daejeon (KR); Taik-min Lee, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 201 days.

(21) Appl. No.: 16/068,500

(22) PCT Filed: May 29, 2017

(86) PCT No.: PCT/KR2017/005565
§ 371 (c)(1),
(2) Date: Jul. 6, 2018

(87) PCT Pub. No.: WO2017/209464
PCT Pub. Date: Dec. 7, 2017

(65) Prior Publication Data
US 2018/0304611 A1 Oct. 25, 2018

(30) Foreign Application Priority Data
Jun. 3, 2016 (KR) .................. 10-2016-0069474

(51) Int. Cl.
*G02B 30/27* (2020.01)
*B41F 7/02* (2006.01)
(Continued)

(52) U.S. Cl.
CPC ............... *B41F 7/025* (2013.01); *B41F 9/01* (2013.01); *B41F 9/061* (2013.01); *B41F 19/001* (2013.01);
(Continued)

(58) Field of Classification Search
CPC .. B41F 7/025; B41F 9/01; B41F 9/061; B41F 19/001; B41F 19/02; B41F 35/00;
(Continued)

(56) References Cited

U.S. PATENT DOCUMENTS 8,794,146 B2 * 8/2014 Jo ........................ B41F 16/00
101/401.1

FOREIGN PATENT DOCUMENTS

JP 08052849 * 2/1996 ................ B44F 9/04
JP 2015-57327 A 3/2015
(Continued)

OTHER PUBLICATIONS

International Search Report for PCT/KR2017/005565 dated Aug. 18, 2017.

*Primary Examiner* — Matthew G Marini
*Assistant Examiner* — Marissa Ferguson-Samreth
(74) *Attorney, Agent, or Firm* — Hauptman Ham, LLP

(57) ABSTRACT

A stereoscopic pattern apparatus includes a base roller and a retrieving roller, a fine pattern hardening roller, an ink inserting roller and a convex pattern hardening roller. The base roller and the retrieving roller respectively provide and retrieve a base film. The fine pattern hardening roller is disposed between the base and retrieving rollers, and forms a lower hardening layer on the base film. A fine pattern is
(Continued)

formed on the lower hardening layer. The ink inserting roller is disposed between the fine pattern hardening roller and the retrieving roller, and inserts an ink into the fine pattern. The convex pattern hardening roller is disposed between the ink inserting roller and the retrieving roller, and forms an upper hardening layer on the lower hardening layer. A convex lens is uniformly formed on the upper hardening layer.

13 Claims, 10 Drawing Sheets

(51) Int. Cl.
| | | |
|---|---|---|
| *B41F 35/00* | (2006.01) | |
| *G03G 15/22* | (2006.01) | |
| *B41F 9/06* | (2006.01) | |
| *B41F 9/01* | (2006.01) | |
| *B41F 19/02* | (2006.01) | |
| *B41F 19/00* | (2006.01) | |
| *B42D 25/45* | (2014.01) | |
| *B42D 25/40* | (2014.01) | |
| *G03G 15/16* | (2006.01) | |
| *B41M 3/14* | (2006.01) | |
| *B41M 3/06* | (2006.01) | |

(52) U.S. Cl.
CPC ............. *B41F 19/02* (2013.01); *B41F 35/00* (2013.01); *B42D 25/40* (2014.10); *B42D 25/45* (2014.10); *G02B 30/27* (2020.01); *G03G 15/224* (2013.01); *B41M 3/06* (2013.01); *B41M 3/14* (2013.01); *G03G 15/1695* (2013.01)

(58) Field of Classification Search
CPC .......... B41F 1/46; B42D 25/40; B42D 25/45; B41M 3/06; B41M 3/14; B41J 2/01; B41J 3/60; B41J 13/0045; B41J 15/04; G03G 15/224; G03G 15/235; G03G 15/1695
See application file for complete search history.

(56) References Cited

FOREIGN PATENT DOCUMENTS

| | | | |
|---|---|---|---|
| KR | 10-2009-0028523 A | 3/2009 | |
| KR | 10-0957622 B1 | 5/2010 | |
| KR | 10-1240679 B1 | 2/2013 | |
| KR | 10-2013-0121296 A | 11/2013 | |
| KR | 20130121296 | * 11/2013 | ............. B41F 17/00 |
| KR | 10-1354972 B1 | 2/2014 | |
| KR | 10-1597703 B1 | 2/2016 | |
| WO | 2012144762 | * 10/2012 | ............. B82Y 40/00 |

* cited by examiner

THREE DIMENSIONAL PATTERN PRINTING DEVICE AND METHOD FOR MANUFACTURING MICRO-OPTICAL FILM STRUCTURE BY USING SAME

CROSS REFERENCE TO RELATED APPLICATION

This present application is a national stage filing under 35 U.S.C § 371 of PCT application number PCT/KR2017/005565 filed on May 29, 2017 which is based upon and claims the benefit of priority to Korean Patent Application No. 10-2016-0069474 filed on Jun. 3, 2016 in the Korean Intellectual Property Office. The disclosures of the above-listed applications are hereby incorporated by reference herein in their entirety.

BACKGROUND

1. Field of Disclosure

The present disclosure of invention relates to a stereoscopic pattern printing apparatus, and a method for manufacturing a micro-optical film structure using the printing apparatus, and more specifically the present disclosure of invention relates to a stereoscopic pattern printing apparatus in which a fine pattern and a lens pattern are formed for forming the stereoscopic pattern, and a method for manufacturing a micro-optical film structure using the printing apparatus.

2. Description of Related Technology

Generally, a line for prevention of forgery or a micro-optical film structure is formed in a money for preventing forgery, and the micro-optical film structure has various kinds of patterns according to a view angle.

A lens pattern having a plurality of convex lenses concentrated with each other is formed in the micro-optical film structure, so that a specific pattern appears according to the view angle.

A prior art related to the micro-optical film structure is Korean laid-open patent application No. 10-2009-0028523 (2009 Mar. 18), and an example of the micro-optical film structure is disclosed.

A prior art related to forming the pattern in the micro-optical film structure is Korean patent No. 10-1240679 (2013 Feb. 28), and the technology of forming a fine pattern directly on a sheet laminated on a substrate using a pressure roller is disclosed.

However, in the above technology, the laminated sheet is detached from the substrate, and simple fine patterns may only be formed repeatedly so that an effect of prevention of forgery is not increased because of the simple and repeated patterns.

SUMMARY

The present invention is developed to solve the above-mentioned problems of the related arts. The present invention provides a stereoscopic pattern printing apparatus in which a fine pattern and a lens pattern are formed for forming the stereoscopic pattern, capable of increasing the prevention of forgery due to a various kinds of patterns, increasing durability of the stereoscopic pattern, and forming the stereoscopic pattern using a relatively simple process.

The present invention also provides a method for manufacturing a micro-optical film structure using the stereoscopic pattern printing apparatus.

According to an example embodiment, a stereoscopic pattern apparatus includes a base roller and a retrieving roller, a fine pattern hardening roller, an ink inserting roller and a convex pattern hardening roller. The base roller and the retrieving roller respectively provide and retrieve a base film. The fine pattern hardening roller is disposed between the base and retrieving rollers, and forms a lower hardening layer on the base film. A fine pattern is formed on the lower hardening layer. The ink inserting roller is disposed between the fine pattern hardening roller and the retrieving roller, and inserts an ink into the fine pattern. The convex pattern hardening roller is disposed between the ink inserting roller and the retrieving roller, and forms an upper hardening layer on the lower hardening layer. A convex lens is uniformly formed on the upper hardening layer.

In an example, the fine pattern hardening roller may include a pattern roller to which an upper surface of the base film is attached, the pattern roller moving the base film, and a hardener nozzle disposed between the base roller and the pattern roller. The fine pattern may be embossed on the pattern roller.

In an example, the ink inserting roller may include an ink roller to which a lower surface of the base film is attached, the ink roller moving the base film, an ink nozzle disposed between the fine pattern hardening roller and the ink roller, and injecting the ink to the base film, and a blade removing the ink on the base film, and disposed over the ink roller.

In an example, the convex pattern hardening roller may include a pattern roller to which an upper surface of the base film is attached, the pattern roller moving the base film, and a hardener nozzle disposed between ink inserting roller and the pattern roller. A concave lens pattern may be formed on the pattern roller.

According to another example embodiment, a stereoscopic pattern printing apparatus includes a base roller, a backup roller and a retrieving roller, a printer and a convex pattern hardening roller. The base roller and the retrieving roller respectively provides and retrieves a base film. The backup roller is disposed in front of the base roller and moving the base film. A lower surface of the base film is attached to the backup roller. The printer is disposed at a side of the backup roller, and transfers an ink on an upper surface of the base film attached to the backup roller as a fine pattern. The convex pattern hardening roller is disposed between the printer and the retrieving roller, and forms an upper hardening layer on the upper surface of the base film. A convex lens is uniformly formed on the upper hardening layer.

In an example, the printer may include a blanket roller disposed at a side of the backup roller so as to be adjacent to the upper surface of the base film, an ink nozzle coating an ink on the blanket roller, a cliché roller making contact with an outer surface of the blanket roller, the ink coated on the blanket roller being transferred to the cliché roller, and a cleaner cleaning the cliché roller. The fine pattern may be engraved on the cliché roller.

In an example, the cleaner may include a container disposed under the cliché roller, and a cleaning liquid received by the container. A lower portion of the cliché roller may be sunk to the cleaning liquid.

In an example, the stereoscopic pattern printing apparatus may include a drier disposed between the backup roller and the retrieving roller, and drying the ink transferred on the upper surface of the base film.

In an example, the convex pattern hardening roller may include a pattern roller to which the upper surface of the base film is attached, the pattern roller moving the base film, and a hardener nozzle disposed between the backup roller and the pattern roller. A concave lens pattern may be formed on the pattern roller.

In an example, a plurality of idle rollers may be disposed between the base roller and the retrieving roller.

According to still another example embodiment, a method for manufacturing a micro-optical film structure include forming a fine pattern on the base film, forming an upper hardening layer on the baser film on which the fine pattern is formed, and forming a convex lens pattern aligned with the fine pattern, via imprinting the upper hardening layer.

In an example, forming the fine pattern may include forming a lower hardening layer on the base film, forming an imprint pattern via imprinting the lower hardening layer, and forming a concave fine pattern on the base film, via filling an ink to the imprint pattern.

In an example, a hardener may be coated on the base film before forming the lower hardening layer, and a hardener may be coated on the lower hardening layer on which the fine pattern is formed before forming the upper hardening layer.

In an example, in forming the fine pattern, a convex fine pattern may be formed on the base film.

In an example, the fine pattern may be formed, via a gravure offset printing or a reverse offset printing.

In an example, a hardener may be coated on the base film before forming the upper hardening layer.

According to the present example embodiments, a fine pattern and a lens pattern are formed on a film, so that the micro-optical film structure may be manufactured.

Here, an ink is transferred to the film and a convex pattern hardening roller is formed via an imprinting, and thus a thickness may be minimized and the manufacturing process may be simplified.

Figure 1:
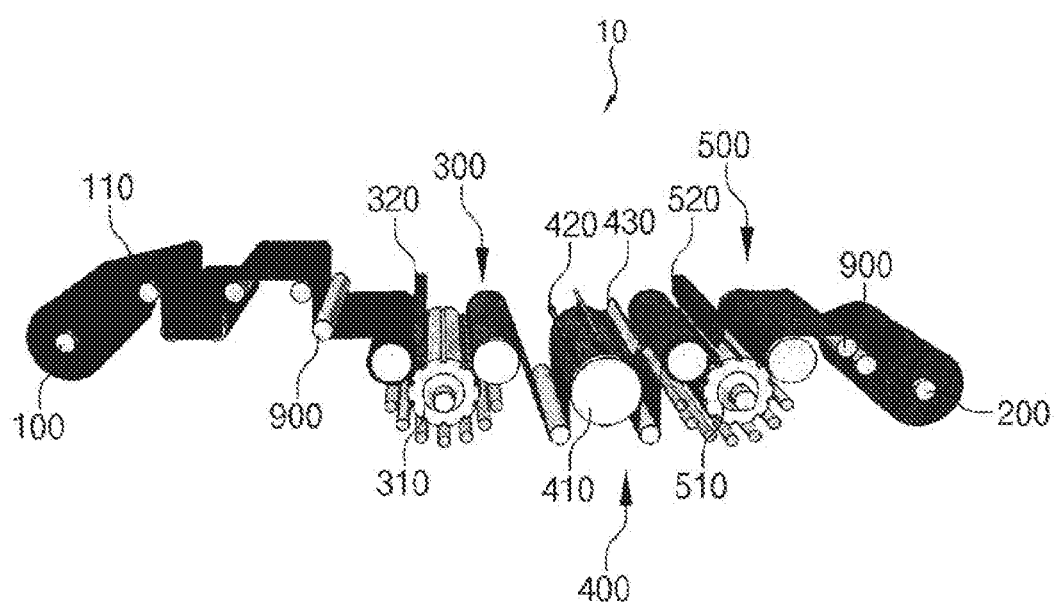
FIG. 1 is a perspective view illustrating a stereoscopic pattern printing apparatus according to an example embodiment of the present invention.

\* Reference numerals 10, 20: stereoscopic pattern printing apparatus
11, 21: micro-optical film structure
100: base roller                110: base film \* Reference numerals

| | |
|---|---|
| 200: retrieving roller | 300: fine pattern hardening roller |
| 310: pattern roller | 320: hardener nozzle |
| 400: ink inserting roller | 410: ink roller |
| 420: ink nozzle | 430: blade |
| 500: convex pattern hardening roller | 510: pattern roller |
| 520: hardener nozzle | 600: backup roller |
| 700: printer | 710: blanket roller |
| 720: ink nozzle | 730: cliché roller |
| 740: cleaner | 741: container |
| 742: cleaning liquid | 800: drier |
| 900: idle roller | 120: imprint pattern |
| 121: first imprint mold | 122, 125: fine pattern |
| 123: convex lens pattern | 124: second imprint mold |
| L1: lower hardening layer | L2: upper hardening layer |
| I: ink | |

DETAILED DESCRIPTION

Hereinafter, the embodiments of the present invention will be described in detail with reference to the accompanied drawings. Same elements or components are expressed with same reference numerals in the drawings.

Detailed explanation regarding prior arts will be omitted not to increase uncertainty of the present example embodiments of the present invention.

Figure 2:
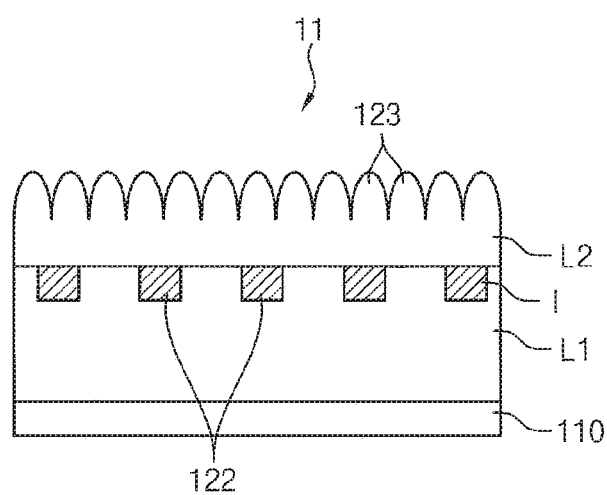
FIG. 2 is a cross-sectional view illustrating a micro-optical film structure manufactured using the stereoscopic pattern printing apparatus of FIG. 1.

FIG. 1 is a perspective view illustrating a stereoscopic pattern printing apparatus according to an example embodiment of the present invention. FIG. 2 is a cross-sectional view illustrating a micro-optical film structure manufactured using the stereoscopic pattern printing apparatus of FIG. 1. As illustrated in FIGS. 1 and 2, the stereoscopic printing apparatus 10 according to an example embodiment of the present invention includes a base roller 100, a retrieving roller 200, a fine pattern hardening roller 300, an ink inserting roller 400, and a convex pattern hardening roller 500. The base roller 100 provides a base film 110 rolled in the base roller 100, and the retrieving roller 200 retrieves the base film 110 provided from the base roller 100. The fine pattern hardening roller 300 is disposed between the base roller 100 and the retrieving roller 200, and forms a lower hardening layer L1 on which a fine pattern is formed on the base film 110. The ink inserting roller 400 is disposed between the fine pattern hardening roller 300 and the retrieving roller 200, and inserts an ink I to the fine pattern. The convex pattern hardening roller 500 is disposed between the ink inserting roller 400 and the retrieving roller 200, and forms an upper hardening layer L2 on which a convex lens is uniformly formed on the lower hardening layer L1.

A driving apparatus is equipped at the retrieving roller 200, so that the retrieving roller 200 rotates and a tension is applied to the base film 110. A plurality of idle rollers 900 is disposed between the base roller 100 and the retrieving roller 200.

The fine pattern hardening roller 300 includes a pattern roller 310 and a hardener nozzle 320. An upper surface of the base film 110 is attached to the pattern roller 310 and thus the pattern roller 310 moves the base film 110. The hardener nozzle 320 is disposed between the base roller 100 and the pattern roller 310. A fine pattern is embossed on the pattern roller 310.

The ink inserting roller 400 includes an ink roller 410, an ink nozzle 420, and a blade 430. A lower surface of the base film 110 is attached to the ink roller 410, and thus the ink roller 410 moves the base film 110. The ink nozzle 420 is disposed between the fine pattern hardening roller 300 and the ink roller 400, and injects the ink I to the base film 110. The blade 430 removes the ink on the base film 110, and is disposed over the ink roller 410.

The convex pattern hardening roller 500 includes a pattern roller 510 and a hardener nozzle 520. An upper surface of the base film 110 is attached to the pattern roller 510, and thus the pattern roller 510 moves the base film 110. The hardener nozzle 520 is disposed between the ink inserting roller 400 and the pattern roller 510. A concave lens pattern is formed on the pattern roller 510.

The stereoscopic pattern printing apparatus of the present example embodiments operate as follows. The retrieving roller 200 rotates to apply the tension to the base film 110 rolled in the base roller 100, and thus the base film 110 moves from the base roller 100 toward the retrieving roller 200.

The idle rollers 900 apply the tension to the base film 110 moving from the base roller 100 toward the retrieving roller 200.

The hardener is coated on the base film 110, and then the base film 110 moves into the fine pattern hardening roller 300. The upper surface of the base film 110 on which the hardener is coated makes contact with the pattern roller 310. Thus, the lower hardening layer L1 on which the fine pattern is engraved, is formed on the base film 110.

The base film 110 on which the lower hardening layer L1 is formed moves into the ink inserting roller 400. Here, the ink I is coated on the upper surface of the lower hardening layer L1.

The blade 430 disposed over the ink roller 410 makes contact with the upper surface of the lower hardening layer L1 when the base film 110 moves in the ink roller 410. Here, the blade 430 makes contact with the ink I, and the blade 430 removes the ink I from the lower hardening layer L1 except for the ink I inserted into the fine pattern engraved on the upper surface of the lower hardening layer L1.

The base film 110 having the ink I inserted into the fine pattern engraved on the upper surface of the lower hardening layer L1, and having the hardener coated on the upper surface of the lower hardening layer L1, moves into the convex pattern hardening roller 500.

Thus, the upper surface of the base film 110 on which the hardener is coated again, makes contact with the pattern roller 510 on which the concave pattern is formed. Thus, the upper hardening layer L2 having the convex pattern formed thereon is formed on the upper surface of the base film 110.

Accordingly, the fine pattern is formed on the lower hardening layer L1 via the imprinting, and then the ink I is coated and the ink I not inserted into the fine pattern is removed, and thus a printing matter having the fine pattern may be manufactured. Here, the printing may be more simplified.

In addition, the upper hardening layer L2 having the convex lens pattern formed thereon is formed on the lower hardening layer L1, via the imprinting using the pattern roller 510 having the concave pattern, and thus the micro-optical film structure 11 may be simply manufactured.

A hardening device hardening the hardener may be equipped at a side of the fine pattern hardening roller 300 and the convex pattern hardening roller 500, and an ink drier may be equipped at the ink inserting roller 400, so the micro-optical film structure 11 may be manufactured more fast.

Figure 3:
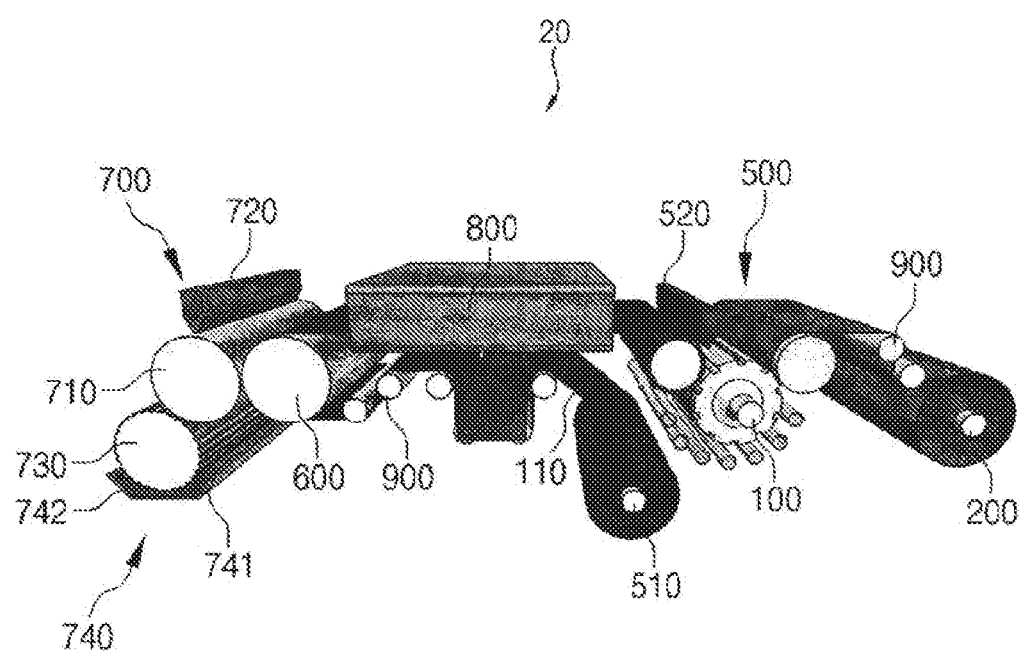
FIG. 3 is a perspective view illustrating a stereoscopic pattern printing apparatus according to another example embodiment of the present invention.
Figure 4:
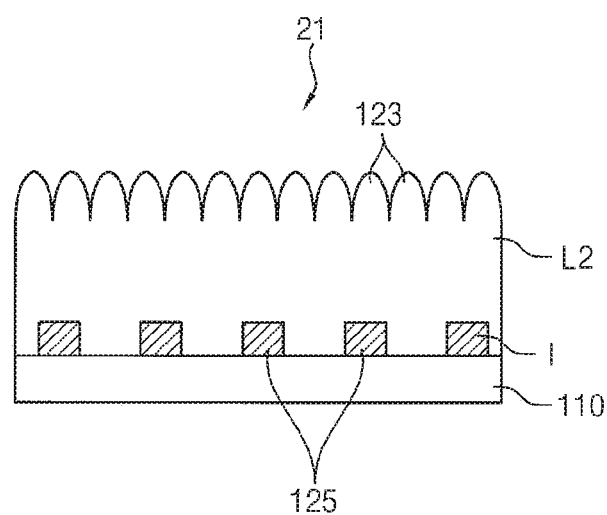
FIG. 4 is a cross-sectional view illustrating a micro-optical film structure manufactured using the stereoscopic pattern printing apparatus of FIG. 3.

FIG. 3 is a perspective view illustrating a stereoscopic pattern printing apparatus according to another example embodiment of the present invention. FIG. 4 is a cross-sectional view illustrating a micro-optical film structure manufactured using the stereoscopic pattern printing apparatus of FIG. 3. Referring to FIGS. 3 and 4, the stereoscopic pattern printing apparatus 20 according to the present example embodiment includes a base roller 100, a retrieving roller 200, a backup roller 600, a printer 700 and a convex pattern hardening roller 500. The base film 110 is rolled by the base roller 100, and is provided from the base roller 100. The retrieving roller 200 retrieves the base film 110 provided from the base roller 100. The backup roller 600 is disposed in front of the base roller 100 and moves the base film 110. Here, a lower surface of the base film 110 is attached to the backup roller 600. The printer 700 is disposed at a side of the backup roller 600, and transfers an ink I on an upper surface of the base film 110 attached to the backup roller 600 as a fine pattern. The convex pattern hardening roller 500 is disposed between the printer 700 and the retrieving roller 200, and forms an upper hardening layer L2 on the upper surface of the base film 110. Here, the convex lens is uniformly formed on the upper hardening layer L2.

Here, the printer 700 may be variously selected, and for example, the printer 700 may be a gravure offset printer, a reverse offset printer, and so on.

A driving apparatus is equipped at the retrieving roller 200, so that the retrieving roller 200 rotates and a tension is applied to the base film 110. A plurality of idle rollers 900 is disposed between the base roller 100 and the retrieving roller 200.

The base film 110 from the base roller 100 moves to the backup roller 600. The base film 110 moves with contacting with the backup roller 600, and thus a moving direction of the base film 110 is reversed. After passing through the backup roller 600, the base film 110 is substantially parallel with an extending portion from the base roller 100 to the backup roller 600, and moves toward the retrieving roller 200.

The printer 700 includes a blanket roller 710, an ink nozzle 720, a cliché roller 730 and a cleaner 740. The blanket roller 710 is disposed at a side of the backup roller 710 so as to be adjacent to the upper surface of the base film 110. The ink nozzle 720 coats an ink I on the blanket roller 710. The cliché roller 730 makes contact with an outer surface of the blanket roller 710, and the ink I coated on the blanket roller is partially transferred to the cliché roller 730. The cleaner 740 cleans the cliché roller 730. The fine pattern is engraved on the cliché roller 730.

The cleaner 740 includes a container 741 disposed under the cliché roller 730, and a cleaning liquid 742 received by the container 741. Here, a lower portion of the cliché roller 730 is sunk to the cleaning liquid 742.

In the present example embodiment, the drier 800 drying the ink I transferred on the upper surface of the base film 110 is disposed between the backup roller 600 and the retrieving roller 200.

The convex pattern hardening roller 500 includes a pattern roller 510 and a hardener nozzle 520. The upper surface of the base film 110 is attached to the pattern roller 510, and thus the pattern roller 510 moves the base film 110. The hardener nozzle 520 is disposed between the backup roller 600 and the pattern roller 510.

The stereoscopic pattern printing apparatus of the present example embodiment operates as follows. The retrieving roller 200 rotates to apply the tension to the base film 110. The base film 110 moves from the base roller 100 to the backup roller 600, and the fine pattern is transferred to the surface of the base film 110 passing through the backup roller 600.

When the base film 110 to which the fine pattern is transferred by the backup roller 600 passes through the drier 800, the ink I transferred to the base film 110 is dried by the drier 800.

The base film 110 having the ink I dried in the drier 800 and having the hardener coated on a portion of the base film 110, moves into the convex pattern hardening roller 500. The portion of the base film 110 on which the hardener is coated makes contact with the pattern roller 510 having the concave lens pattern formed thereon. Thus, the upper hardening layer L2 having the convex lens pattern formed thereon is formed on the upper surface of the base film 110.

Figure 5:
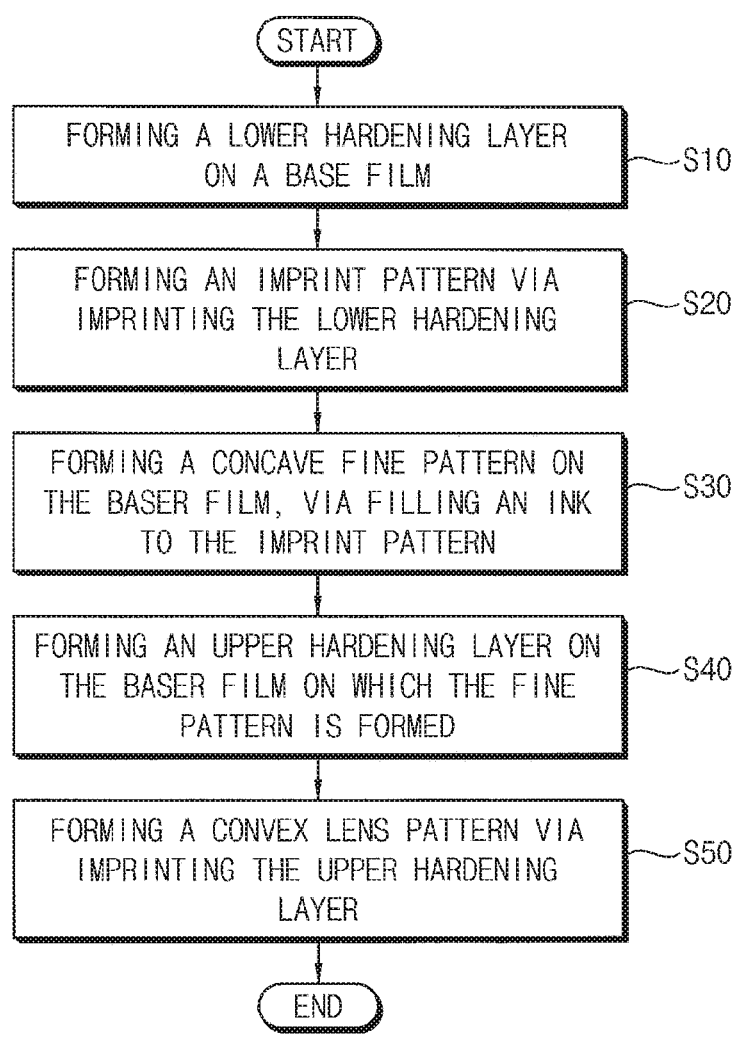
FIG. 5 is a flow chart illustrating a method for manufacturing the micro-optical film structure of FIG. 2.

FIG. 5 is a flow chart illustrating a method for manufacturing the micro-optical film structure of FIG. 2. FIGS. 6A to 6E are process views illustrating the method for manufacturing the micro-optical film structure of FIG. 5.

Figure 6A:
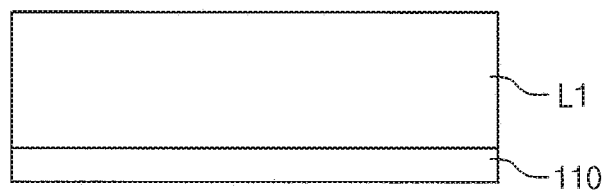
FIGS. 6A to 6E are process views illustrating the method for manufacturing the micro-optical film structure of FIG. 5.

Referring to FIGS. 5 and 6A, in the method for manufacturing the micro-optical film structure 11, first, the lower hardening layer L1 is formed on the base film 110 (step S10).

Here, the hardener may be coated on the base film 110, before forming the lower hardening layer L1.

The lower hardening layer L1 is formed on the base film, by a predetermined thickness.

Figure 6B:
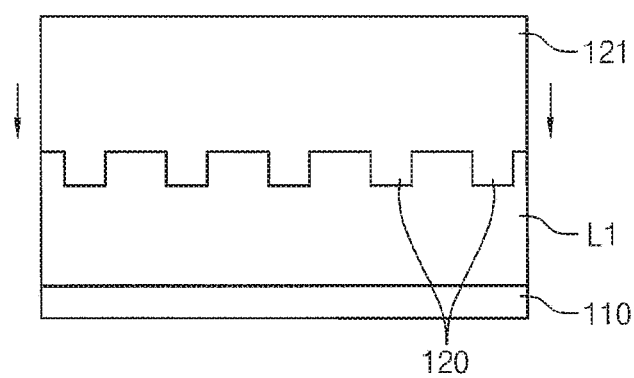

Then, referring to FIGS. 5 and 6B, a first imprint mold 121 is imprinted on the upper surface of the lower hardening layer L1, and thus an imprint pattern 120 is formed on the upper surface of the lower hardening layer L1 (step S20).

Here, the first imprint mold 121 may be the pattern roller 310 of the stereoscopic pattern printing apparatus 10, as mentioned above, and the pattern roller 310 functions as the imprint mold to form the imprint pattern 120 on the upper surface of the lower hardening layer L1.

Figure 6C:
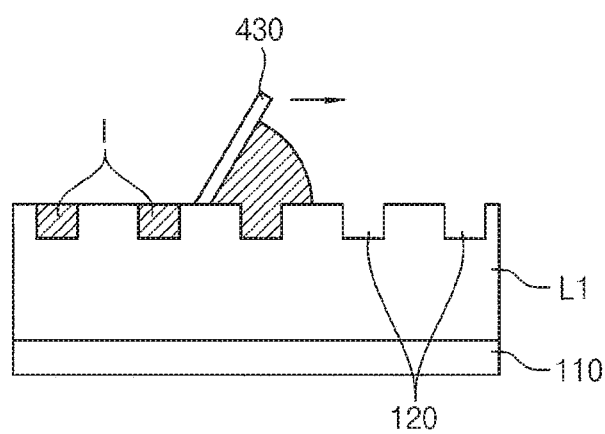

The, referring to FIGS. 5 and 6C, the ink I is filled into the imprint pattern 120, and thus the concave fine pattern 122 is formed on the base film 110 (step S30).

Here, the fine pattern 122 is formed via filling the ink I into the imprint pattern 120, and is formed on the upper surface of the lower hardening layer L1.

In addition, as in the stereoscopic pattern printing apparatus 10 as mentioned above, the ink I is filled into the imprint pattern 120 via the blade 420, and the ink I not inserted into the imprint pattern 120 is removed.

Figure 6D:
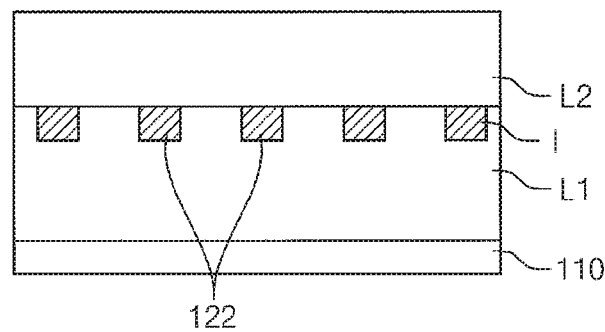

Then, referring to FIGS. 5 and 6D, the upper hardening layer L2 is formed on the base film 110 on which the fine pattern 122 is formed (step S40).

Here, the hardener may be coated on the lower hardening layer L1 on which the fine pattern 122 is formed.

In addition, the upper hardening layer L2 may be formed on the upper surface of the lower hardening layer L1 on which the fine pattern 122 is formed, by a predetermined thickness.

Figure 6E:
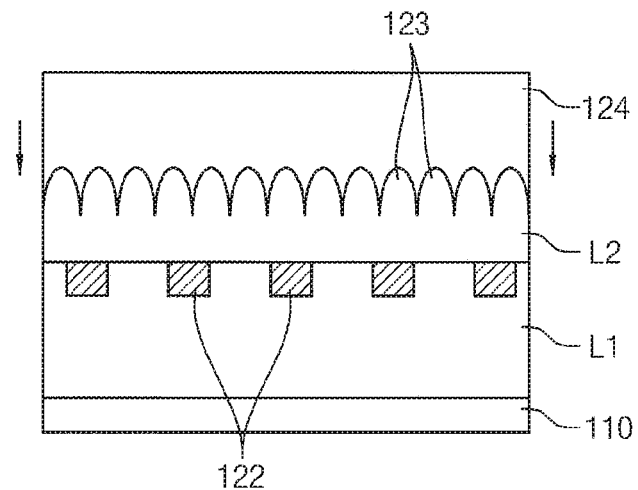

Then, referring to FIGS. 5 and 6E, a second imprint mold 124 is imprinted on the upper hardening layer L2, and thus the convex lens pattern 123 is formed on the upper surface of the upper hardening layer L2 (step S50).

Here, the second imprint mold 124 may be the pattern roller 510 of the stereoscopic pattern printing apparatus 10, as mentioned above, and the pattern roller 510 functions as the imprint mold to form the convex lens pattern 123 on the upper surface of the upper hardening layer L2.

The convex lens pattern 123 is aligned with the fine pattern 122, and although not shown in the figure, an additional aligning mark may be formed for aligning the fine pattern 122 with the convex lens pattern 123, or alternatively, an additional optical device may take a picture of a position of the fine pattern 122 for aligning the fine pattern 122 with the convex lens pattern 123, which means that the position of the second imprint mold 124 may be fed back to be aligned.

Then, the second imprint mold 124 is removed, and then as illustrated in FIG. 2, the micro-optical film structure 11 is manufactured.

As illustrated in the figure, in the micro-optical film structure 11, the fine pattern 122 is formed concavely on the lower hardening layer L1, and the convex lens pattern 123 and the fine pattern 122 are aligned with each other to form the stereoscopic pattern which may be displayed variously based on a viewing angle of user.

Figure 7:
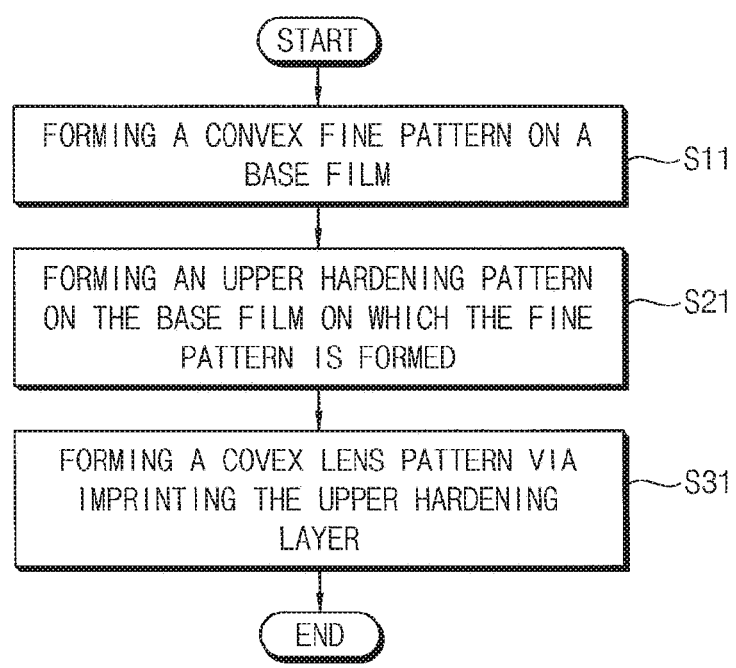
FIG. 7 is a flow chart illustrating a method for manufacturing the micro-optical film structure of FIG. 4.
Figure 8A:
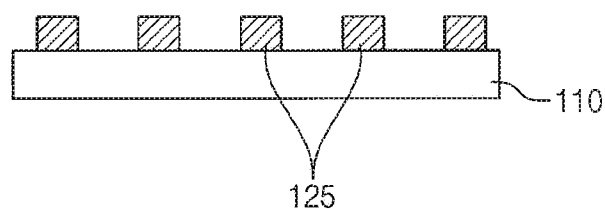
FIGS. 8A to 8C are process views illustrating the method for manufacturing the micro-optical film structure of FIG. 7.
Figure 8B:
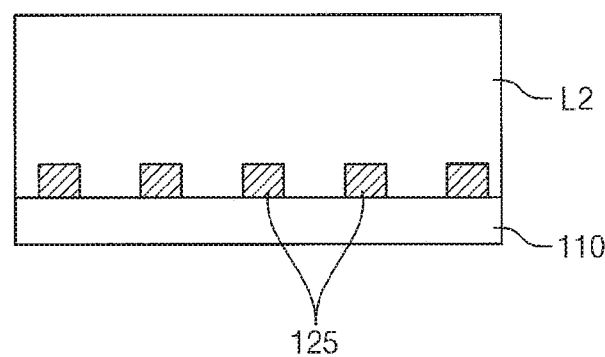
Figure 8C:
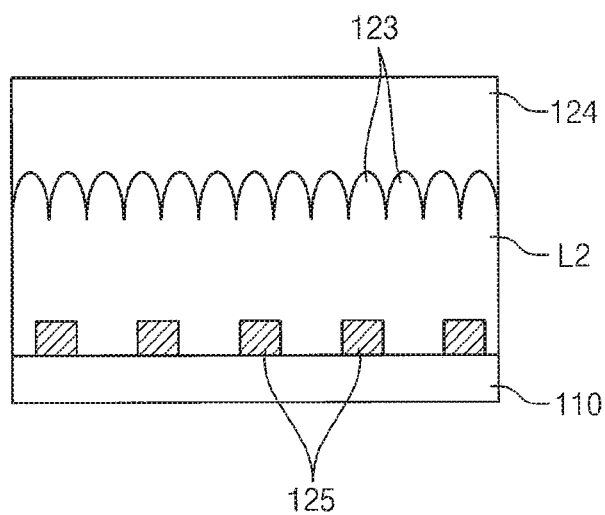

FIG. 7 is a flow chart illustrating a method for manufacturing the micro-optical film structure of FIG. 4. FIGS. 8A to 8C are process views illustrating the method for manufacturing the micro-optical film structure of FIG. 7.

Referring to FIGS. 7 and 8A, in a method of manufacturing the micro-optical film structure 21 according to the present example embodiment, first, the fine pattern 125 is formed on the base film 110 (step S11).

The fine pattern 125, as mentioned above, may be formed using the printer 700 of the stereoscopic pattern printing apparatus 20.

Here, the printer 700 may be variously selected, and for example, may be a gravure offset printer, a reverse offset printer, and so on. Thus, the fine pattern 125 may be formed via a gravure offset printing, a reverse offset printing, and so on.

Accordingly, the fine pattern 125 may be formed via various kinds of printing processes, and the fine pattern 125 may be formed as the convex pattern protruded on the base film 110.

Then, referring to FIGS. 7 and 8B, the upper hardening layer L2 is formed on the base film 110 on which the fine pattern 125 is formed.

Here, the upper hardening layer L2 has a predetermined thickness to cover the upper surfaces of the fine pattern 125 and the base film 110.

In addition, the hardener may be coated on the upper surface of the base film 110 on which the fine pattern 125 is formed.

Then, referring to FIGS. 7 and 8C, a second imprint mold 124 is imprinted on the upper hardening layer L2, and thus the convex lens pattern 123 is formed on the upper surface of the upper hardening layer L2 (step S31).

Here, the second imprint mold 124 may be the pattern roller 510 of the stereoscopic pattern printing apparatus 20, as mentioned above, and the pattern roller 510 functions as the imprint mold to form the convex lens pattern 123 on the upper surface of the upper hardening layer L2.

The convex lens pattern 123 is aligned with the fine pattern 125, and although not shown in the figure, an additional aligning mark may be formed for aligning the fine pattern 125 with the convex lens pattern 123, or alternatively, an additional optical device may take a picture of a position of the fine pattern 125 for aligning the fine pattern 125 with the convex lens pattern 123, which means that the position of the second imprint mold 124 may be fed back to be aligned.

Then, the second imprint mold 124 is removed, and then as illustrated in FIG. 4, the micro-optical film structure 21 is manufactured.

As illustrated in the figure, in the micro-optical film structure 21, the upper hardening layer L2 is only formed on the base film 110, and thus the stereoscopic pattern may be formed with relatively small thickness, and the convex lens pattern 123 and the fine pattern 125 are aligned with each other to form the stereoscopic pattern which may be displayed variously based on a viewing angle of user.

Accordingly, in the present example embodiment, the ink I is transferred to the base film 110, and then the convex pattern hardening roller 500 is formed via the imprinting. Thus, the thickness may be minimized and the manufacturing processes may be simplified.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A stereoscopic pattern printing apparatus comprising:
   a base roller and a retrieving roller respectively providing and retrieving a base film;
   a fine pattern hardening roller disposed between the base and retrieving rollers, and forming a lower hardening layer on the base film, a fine pattern being formed on the lower hardening layer;
   an ink inserting roller disposed between the fine pattern hardening roller and the retrieving roller, and inserting an ink into the fine pattern; and
   a convex pattern hardening roller disposed between the ink inserting roller and the retrieving roller, and forming an upper hardening layer on the lower hardening layer, a convex lens being uniformly formed on the upper hardening layer,
   wherein the fine pattern hardening roller comprises a first pattern roller configured to rotate along the base film with an upper surface of the base film directly making contact with the first pattern roller, the fine pattern being embossed on the first pattern roller, so that the fine pattern having concave patterns is formed on the lower hardening layer via an imprint of the fine pattern,
   wherein the convex pattern hardening roller comprises a second pattern roller configured to rotate along the base film with the upper surface of the base film directly making contact with the second pattern roller, a concave lens pattern being formed on the second pattern roller, so that the convex lens is formed on the upper hardening layer via an imprint of the concave lens pattern, and
   wherein the convex lens is formed over the fine pattern continuously.

2. The stereoscopic pattern printing apparatus of claim 1, wherein the fine pattern hardening roller further comprises:
   a hardener nozzle disposed between the base roller and the first pattern roller.

3. The stereoscopic pattern printing apparatus of claim 1, wherein the ink inserting roller comprises:
   an ink roller to which a lower surface of the base film is attached, the ink roller moving the base film;
   an ink nozzle disposed between the fine pattern hardening roller and the ink roller, and injecting the ink to the base film; and
   a blade removing the ink on the base film, and disposed over the ink roller.

4. The stereoscopic pattern printing apparatus of claim 1, wherein the convex pattern hardening roller further comprises:
   a hardener nozzle disposed between ink inserting roller and the second pattern roller.

5. A stereoscopic pattern printing apparatus comprising:
   a base roller and a retrieving roller respectively providing and retrieving a base film;
   a backup roller disposed in front of the base roller and moving the base film, a lower surface of the base film being attached to the backup roller;
   a printer disposed at a side of the backup roller, and transferring an ink on an upper surface of the base film attached to the backup roller as a fine pattern; and
   a convex pattern hardening roller disposed between the printer and the retrieving roller, and forming an upper hardening layer on the upper surface of the base film, a convex lens being uniformly formed on the upper hardening layer,
   wherein the printer comprises:
      a blanket roller disposed at a side of the backup roller so as to be adjacent to the upper surface of the base film;
      an ink nozzle coating an ink on the blanket roller;
      a cliché roller making contact with an outer surface of the blanket roller, the ink coated on the blanket roller being transferred to the cliché roller; and
      a cleaner cleaning the cliché roller,
   wherein the fine pattern is engraved on the cliché roller.

6. The stereoscopic pattern printing apparatus of claim 5, wherein the cleaner comprises:
   a container disposed under the cliché roller; and
   a cleaning liquid received by the container, a lower portion of the cliché roller being sunk to the cleaning liquid.

7. The stereoscopic pattern printing apparatus of claim 5, further comprising a drier disposed between the backup roller and the retrieving roller, and drying the ink transferred on the upper surface of the base film.

8. The stereoscopic pattern printing apparatus of claim 5, wherein the convex pattern hardening roller comprises:
   a pattern roller to which the upper surface of the base film is attached, the pattern roller moving the base film; and
   a hardener nozzle disposed between the backup roller and the pattern roller,
   wherein a concave lens pattern is formed on the pattern roller.

9. The stereoscopic pattern printing apparatus of claim 5, wherein a plurality of idle rollers is disposed between the base roller and the retrieving roller.

10. A method for manufacturing a micro-optical film structure comprises:
    forming a fine pattern on the base film;
    forming an upper hardening layer on the baser film on which the fine pattern is formed; and
    forming a convex lens pattern aligned with the fine pattern, via imprinting the upper hardening layer,
    wherein said forming the fine pattern comprises:
       forming a lower hardening layer on the base film;
       forming an imprint pattern, via imprinting a first pattern roller having a fine pattern embossed on the first pattern roller, on the lower hardening layer, to form concave patterns on the lower hardening layer; and
       forming filling an ink to the concave patterns of the lower hardening layer,
    wherein said forming the convex lens pattern comprises:
       forming the upper hardening layer on the lower hardening layer; and
       forming an imprint pattern, via imprinting a second pattern roller having a concave lens pattern on the second pattern roller, on the upper hardening layer, to form a convex lens on the upper hardening layer, and
    wherein the convex lens is formed over the fine pattern continuously.

11. The method of claim 10, wherein a hardener is coated on the base film before forming the lower hardening layer, and a hardener is coated on the lower hardening layer on which the fine pattern is formed before forming the upper hardening layer.

12. The method of claim 10, wherein the fine pattern is formed, via a gravure offset printing or a reverse offset printing.

13. The method of claim 10, wherein a hardener is coated on the base film before forming the upper hardening layer.

* * * * *